3,835,049
OIL SPILL CONTROL
Jack A. King, Tulsa, Okla., assignor to Cities Service Oil Company, Tulsa, Okla.
No Drawing. Continuation-in-part of abandoned application Ser. No. 167,805, June 30, 1971. This application Aug. 23, 1973, Ser. No. 390,835
Int. Cl. C02b 9/02
U.S. Cl. 210—63                    6 Claims

ABSTRACT OF THE DISCLOSURE

Hydrocarbon oil floating on the surface of water is recovered by admixing with the hydrogen oil in the presence of oxygen one to fifty parts by weight of a drying oil per one hundred parts by weight of the hydrocarbon oil, wherein at least one of ten carbon-to-carbon bonds of the drying oil are double bonds and wherein the drying oil contains at least one carbonyl moiety per molecule, to coagulate the admixture, and removing the admixture from the surface of the water.

This application is a continuation-in-part of application 167,805, filed June 30, 1971, entitled "Process for Controlling Oil Spills" by Jack A. King, now abandoned.

BACKGROUND OF THE INVENTION

Field of the Invention

The invention relates to a process for the recovery of oil floating on water.

BRIEF DESCRIPTION OF THE PRIOR ART

Oil spills of hydrocarbon oil floating on the surface of water sometimes result from the failure of equipment on offshore drilling platforms and tankers. Oil slicks of oil floating on water have on occasion damaged the enironment. Containment and removal of such oil slicks are of considerable importance to the petroleum industry. Greatly expanded production and transportation of hydrocarbon oils in the aqueous environment have motivated the development of many mechanical and chemical treatments for the collection and containment of oil slicks.

Often, the use of chemicals to control oil spills is undesirable when protection or preservation of fresh water supplies, wildlife, and beach areas are of prime concern.

It is often very desirable to recover the oil spill from the surface of the body of water to avoid environmental contamination as well as to conserve the hydrocarbons recovered.

A process whereby mechanical collection of oil spills floating upon the surface of water can be more effectively and efficiently recovered is of considerable benefit to the oil industry as well as the general public.

OBJECTS OF THE INVENTION

An object of the invention is to provide a process for the collection and recovery of oil from the surface of a body of water.

Another object of the invention is to provide a process whereby hydrocarbon oil floating upon a natural body of water can be coagulated so as to facilitate removal of the coagulated admixture from the surface of the water by conventional collection means.

SUMMARY OF THE INVENTION

According to the present invention, it has been discovered that hydrocarbon oil floating on the surface of water can be readily recovered by admixing with the hydrocarobn oil in the presence of oxygen one to fifty parts by weight of a drying oil per one hundred parts by weight of the hydrocarbon oil, and then removing the admixture from the surface of the water with any conventional means for removing floating oil from the surface of water. The hydrocarbon oil which is coagulated according to the process of this invention is much more readily collected and removed from the surface of the water than uncoagulated hydrocarbon oil.

It has now been discovered that oil floating on the surface of water is effectively and efficiently recovered by admixing a drying oil with hydrocarbon oil in the presence of oxygen to coagulate the admixture and then removing the mixture from the surface of the water by means heretofore known for the removal of oil floating on the surface of water.

The drying oil employed according to the process of this invention includes any drying oil heretofore known to the art wherein at least one of ten carbon-to-carbon bonds of the drying oil molecule are double bonds wherein each molecule of the drying oil contains at least one carbonyl moiety. Such drying oils are in general tricarboxylates of glycerin and unsaturated carboxylic acids. Such tricarboxylates are usually derived from natural sources. Exemplary of such materials are tung (China wood) oil, derived from the seeds of Aleurites cordata, a tree indigenous to China and Japan, by roasting, grinding, and pressing; linseed oil, extracted from flax seed; and the like. Tung oil contains chiefly a glyceride of eleostearic acid with a small proportion of oleic and stearic glycerides. Linseed oil is comprised of liquid glycerides and glycerides of solid fatty acids with the drying property due to linolein, a glyceride of linoleic acid.

Also included among the drying oils of the instant invention are the carboxylic acids formed by hydrolysis of carboxylates, and esters formed by reaction of such carboxylic acids having suitable unsaturation with polyhydric alcohols. Also included are drying oils which are formed by treatment of natural and synthetic materials to form drying oils. Ellis, The Chemistry of Synthetic Resins, Volume I (1935), Reinhold Publishing Corporation, provides much disclosure in the art relating to drying oils. Such materials which meet the criteria of the specification and claims of this application are very well known to those skilled in the art.

It is presently particularly preferred to employ linseed oil or tung oil in the process of this invention. Blends of drying oils can be also employed if desired.

According to the process of this invention, one to fifty parts by weight of drying oil per one hundred parts by weight of hydrocarbon oil floating on the water surface is employed. Less than about one part by weight per one hundred parts by weight of the floating hydrocarbon oil is normally not effective, and over about fifty parts by weight exceeds the bounds of economic feasibility. Presently, it is particularly preferred to employ about one to about twenty parts by weight of drying oil per one hundred parts by weight of hydrocarbon oil.

The effect of oxygen to cause polymerization and solidification of drying oils is well known to those skilled in the art. The Ellis reference heretofore cited gives much background disclosure on such reaction which is widely employed in the paint and coatings industry.

The carbonyl moiety of drying oils of the invention can be found in either a carboxy or a carboxylate moiety.

Linseed oil is a particularly preferred drying oil for use according to the invention. Linseed oil has a specific gravity of 0.9316 to 0.9354 and is soluble in most hydrocarbon mixtures. When a mixture of linseed oil and hydrocarbon oil is exposed to air, the mixture takes up oxygen from the air, gains in weight and becomes much more viscous and may become semi-solid.

The oxygen which is present in the admixture of the hydrocarbon oil and the drying oil can be supplied by actual contact with the air of the atmosphere. Often it is preferred to introduce oxygen into the admixture by mechanical means such as by the use of blowers, air compressors, and the like. It is also within the scope of the invention to supply oxygen by means of admixing an oxygen supplying compound with the admixture of the hydrocarbon oil and the drying oil.

According to one presently preferred mode of operation of the invention, a catalytic amount of an accelerator for the reaction between the oxygen and the drying oil is admixed with the mixture comprising the hydrocarbon oil and the drying oil. There are a large number of such accelerators for this reaction known to the art. Examples of some suitable materials include finely divided metals such as platinum, palladium, nickel, cobalt, iron, copper, manganese and the like. Also suitable are certain oxides and salts of metals such as zinc, manganese, lead, and copper, copper carbonate and hydroxides of Group I–A of the Periodic Table. Some examples of such suitable alkali metal hydroxides include sodium hydroxide, lithium hydroxide, and potassium hydroxide. Many other materials are known to the art to be useful. The Ellis reference heretofore cited presented considerable disclosure relating to such suitable materials.

An amount of accelerator sufficient to accelerate the reaction between the drying oil and the oxygen should be employed, that is, a catalytic amount. Often, amounts in the range of 0.01 to 10.0 parts by weight of accelerator per part by weight of drying oil are suitable. However, it should be understood that an accelerator is not necessary for the practice of the process of this invention.

The admixing of the hydrocarbon oil floating on the surface of the water and the drying oil can be by any means known to the art for the admixing of two liquids. Suitably, the drying oil can be sprayed onto the surface of the slick of the hydrocarbon oil floating on the surface of the water with sufficient force that adequate mixing is obtained.

When the admixture of hydrocarbon oil and drying oil has coagulated in the presence of oxygen, the coagulated mixture can be removed from the surface of the water by any means heretofore known to the art for the recovery of oil spills from the surface of water. A large number of devices are known to the art for carrying out this step.

Insofar as the invention provides a practical, efficient, and effective means for coagulation of hydrocarbon oil floating on the surface of water, the oil can then be much more expeditiously handled by conventional mechanical removal devices and/or contained in a given area by means of retaining devices such as booms and the like.

The coagulated hydrocarbon oil and drying oil admixtures formed may be thermally broken by application of heat after collection. Recovery of the oil which would otherwise be lost is an important conservation aspect of the invention.

In order to more fully understand the nature and objects of the present invention, reference is made to the following examples. However, these examples are given merely to illustrate the invention, and are not to be construed as limiting the invention in any manner.

EXAMPLE I

By way of exemplification, an oil slick formed by a spill of a high-gravity crude oil on a bay inlet is treated by spraying thereupon sufficient linseed oil that about ten parts of linseed oil are present for each part by weight of crude oil on the surface of the water. Within a short time, it is noted that the admixture formed of the drying oil and the crude oil on the surface of the water becomes congealed. Thereupon, the congealed admixture is collected into a small area by means of a floating boom and is recovered from the water by simply dipping the congealed mixture therefrom.

This example demonstrates the process of this invention wherein linseed oil is employed to coagulate a hydrocarbon oil floating on the surface of the water with subsequent removal of the admixture from the surface of the water.

EXAMPLE II

By way of further exemplification of the process of this invention, diesel oil is spilled upon the surface of a body of fresh water. Thereupon, the oil slick of diesel oil is treated by agitating with a surface agitator with sufficient tung oil that about fifteen parts by weight of tung oil are present for each one hundred parts by weight of diesel fuel on the surface of the water. Thereupon, the admixture congeals within a matter of minutes and is skimmed from the surface of the water with a conventional oil skimmer.

This example demonstrates the process of this invention wherein a refined hydrocarbon oil is coagulated by contact with a drying oil in the presence of oxygen and then removed from the surface of the water.

As is apparent to those skilled in the art, variations and modifications can be made on the instant invention without departing from the spirit and scope thereof, and it is to be understood that this application is not limited to the specific embodiments disclosed herein except as defined in the appended claims.

What is claimed is:

1. A process for recovering hydrocarbon oil floating on the surface of water comprising:
   a. admixing with the hydrocarbon oil in the presence of oxygen one to fifty parts by weight of a composition consisting essentially of a drying oil per one hundred parts by weight of the hydrocarbon oil, wherein at least one of ten carbon-to-carbon bonds of the drying oil are double bonds and wherein the drying oil is a glyceride, to coagulate the admixture, and
   b. removing the coagulated admixture from the surface of the water.

2. The process of Claim 1 wherein one to twenty parts by weight of drying oil are employed per one hundred parts by weight of the hydrocarbon oil.

3. The process of Claim 1 wherein the hydrocarbon oil is petroleum or a refined petroleum product and wherein the drying oil is tung oil or linseed oil.

4. The process of Claim 1 wherein the hydrocarbon oil is petroleum or a refined petroleum product which is floating on the surface of a natural body of water, wherein one to twenty parts by weight of drying oil are employed per one hundred parts by weight of the hydrocarbon oil, wherein the drying oil is tung oil or linseed oil, and wherein oxygen is introduced into the admixture by mechanically injecting air thereinto.

5. The process of claim 4 wherein coagulation of the admixture is accelerated by admixing therewith an effective amount of an accelerator for the reaction of oxygen with the drying oil, said accelerator consisting essentially of a material selected from the group consisting of (a) finely divided platinum, copper, palladium, iron, nickel, manganese, and cobalt, (b) zinc oxide, manganese oxide, lead oxide, copper oxide, and copper carbonate, and (c) alkali metal hydroxides.

6. The process of Claim 5 wherein 0.01 to 10.0 parts by weight of accelerator are employed for each hundred parts by weight of drying oil.

References Cited

UNITED STATES PATENTS

| | | | |
|---|---|---|---|
| 3,755,189 | 8/1973 | Gilchrist et al. | 210—42 X |
| 2,367,384 | 1/1945 | Tymstra et al. | 210—40 |
| 1,963,065 | 6/1934 | Auer et al. | 252—312 |
| 2,391,041 | 12/1945 | Stamberger | 252—312 X |
| 2,573,599 | 12/1946 | Price | 252—312 |
| 3,272,758 | 9/1966 | De Lew et al. | 210—42 X |
| 3,625,857 | 12/1971 | Weimer et al. | 210—59 X |

THOMAS G. WYSE, Primary Examiner

U.S. Cl. X.R.

210—50, Dig 21; 252—316